(12) United States Patent
Schroth

(10) Patent No.: US 7,210,707 B2
(45) Date of Patent: May 1, 2007

(54) BELT ASSEMBLY

(75) Inventor: Carl-Jürgen Schroth, Soest (DE)

(73) Assignee: Schroth Safety Products GmbH, Arnsberg (DE)

( * ) Notice: Subject to any disclaimer, the term of this patent is extended or adjusted under 35 U.S.C. 154(b) by 299 days.

(21) Appl. No.: 10/896,768

(22) Filed: Jul. 22, 2004

(65) Prior Publication Data

US 2005/0179244 A1 Aug. 18, 2005

Related U.S. Application Data

(60) Provisional application No. 60/503,755, filed on Sep. 18, 2003.

(51) Int. Cl.
*B60R 22/00* (2006.01)
*B60R 22/14* (2006.01)

(52) U.S. Cl. .................................... 280/801.1; 297/484

(58) Field of Classification Search ................ 280/807, 280/808, 801.1, 801.2; 297/465, 468, 483, 297/484; 2/102; B60R 21/14
See application file for complete search history.

(56) References Cited

U.S. PATENT DOCUMENTS

| 2,655,329 | A | * | 10/1953 | Martin ..................... 244/122 B |
| 3,380,776 | A | * | 4/1968 | Dillender .................... 297/484 |
| 3,529,864 | A | * | 9/1970 | Sharp et al. ................ 297/467 |
| 4,028,948 | A | * | 6/1977 | Frost et al. ...................... 74/2 |
| 4,488,691 | A | * | 12/1984 | Lorch ..................... 244/151 R |
| 4,570,974 | A | * | 2/1986 | Dove ....................... 280/801.1 |
| 4,738,413 | A | * | 4/1988 | Spinosa et al. ......... 244/151 R |
| 5,544,363 | A | * | 8/1996 | McCue et al. ................. 2/102 |
| 5,579,785 | A | * | 12/1996 | Bell ........................... 128/875 |
| 5,890,227 | A | * | 4/1999 | Brown ......................... 2/102 |
| 6,742,848 | B2 | * | 6/2004 | Ruff ........................... 297/485 |

FOREIGN PATENT DOCUMENTS

| DE | PS 290 681 | 9/1920 |
| DE | AS 11 51 689 | 7/1963 |
| DE | GM 76 26 542 | 12/1977 |
| DE | 33 00 471 C2 | 7/1984 |
| WO | WO 9625062 A1 * | 8/1996 |

* cited by examiner

*Primary Examiner*—Paul N. Dickson
*Assistant Examiner*—Tiffany Webb
(74) *Attorney, Agent, or Firm*—Henry M. Feiereisen

(57) ABSTRACT

A belt assembly for securing the sitting and standing positions of an occupant of a vehicle has two lap belts which can be coupled to the vehicle and are brought together at an abdomen-side central buckle and which are swingable in parallel relation to the occupant's body and include retractors. Two length-adjustable body belts extend from the central lock across the torso, shoulders and back of the occupant, and two length-adjustable, loop-like leg belts are connected to length portions of the body belts, with the length portions at least indirectly connected to the lap belts. The body belts have buckle-distal ends which are fastened to the leg belts. The body belts cross at the back of the occupant and are connected there with one another. The belt assembly can be directly connected to a vest which can be suited to the body of the occupant via hook-and-loop fasteners.

20 Claims, 5 Drawing Sheets

BELT ASSEMBLY

CROSS-REFERENCES TO RELATED APPLICATIONS

This application claims the benefit of prior filed U.S. provisional Application No. 60/503,755, filed Sep. 18, 2003, pursuant to 35 U.S.C. 119(e), the disclosure of which is incorporated herein by reference.

BACKGROUND OF THE INVENTION

The present invention relates, in general, to a belt assembly for securing an occupant of a vehicle, such as, e.g., the position of the commander of a military armored vehicle, in a sitting position as well as standing position.

The commander of an armored vehicle can assume a standing position, when the hatch is open, for surveying the surroundings. On the other hand, the commander assumes a sitting position, when the hatch is closed. The commander is able to completely fulfill his jobs in both positions only when restrained in these positions also during travel in rough terrain, when hitting an obstacle, at mine explosions, or at rollover of an armored vehicle. Also rescue personnel and physicians in ambulances may assume comparable positions during travel and must be able to so move in sitting or standing positions, while restrained, that persons transported in the vehicle can be reliably taken care of. Furthermore, such positions in helicopters used for civil or military purposes are conceivable, when handicapped persons that are immobile require assistance (e.g. hoisting) when e.g. the door is open.

Various belt assemblies heretofore designed for land and air vehicles are not suitable to meet these demands as they normally take into account only one or the other position of an occupant, however ignore the fact that the occupant must be restrained during activity while sitting or standing.

German patent publication DE-AS 11 51 689 as well as German utility model DE-GM 76 26 542 disclose belt assemblies for persons sitting in a vehicle, which include body belts and leg belts releasably connected with one another via an abdomen-side central buckle. The configuration of these belt assemblies is so conceived that the persons are unable to switch from the sitting position into a standing position, when being restrained.

German Pat. No. DE-PS 290 681 discloses a restraint for a person standing in an aircraft. This restraint includes a restraining belt which is worn by the person around the pelvis and is connected with the frame of the aircraft via flexible and resilient members extending radially in relation to the restraining belt. Such an assembly enables only a securement of a standing person.

German patent publication DE 33 00 471 C2 discloses a belt assembly which is directly associated to a vest worn by a person that takes a seat in sitting position in a vehicle and wants also to be restrained in this position by the belt assembly.

It would therefore be desirable and advantageous to provide an improved belt assembly which obviates prior art shortcomings and secures an occupant of a vehicle in sitting and standing positions and which can be quickly attached and removed.

SUMMARY OF THE INVENTION

According to one aspect of the present invention, a belt assembly for securing the sitting and standing positions of an occupant of a vehicle, includes two lap belts having one end adapted for connection to a vehicle and another end, with the lap belts swingable in substantial parallel relation to the body of an occupant, a central buckle constructed to receive the other end of the lap belts, two length-adjustable body belts extending from an area of the central buckle across the torso, shoulder and back of the occupant and intersecting one another at a crossing point on the occupant's back for interconnection at the crossing point, with the body belts having length portions which are respectively connected, at least indirectly, to the lap belts, and have ends distal to the central buckle, and two length-adjustable, loop-like leg belts connected to the ends of the length portions of the body belts.

The belt assembly according to the present invention thus includes two lap belts which are brought together at an abdomen-side central buckle. The central buckle can be opened by a turning actuation or by a pushing actuation and has receptacles for locking tongues which are directly or indirectly associated to a lap belt. When being associated indirectly to a lap belt, the locking tongues have, in turn, connections that allow a releasable coupling with lap belts. In this case, the lap belts are associated to the vehicle and guided via retractors (belt winders).

When, however, the locking tongues are associated directly to the lap belt, the vehicle is provided preferably only with receptacles for engagement tongues associated to the lap belts at a distance to the central buckle. In this case, the retractors are then disposed preferably in proximity of the locking tongues.

The lap belts are swingably arranged in relation to the central buckle in parallel relationship to the body surface. This is so because the sitting as well as standing position must be taken into account. The change from one position into the other position is then assured by the retractors while maintaining the safety functions.

The two body belts of the belt assembly according to the invention extend from the area of the central buckle across the torso, shoulders and back of the occupant. The body belts can be constructed length-adjustable, whereby the length change can be realized e.g. through division in length portions, preferably in the area of the torso. Attachment of the body belts can be implemented preferably in the area of the locking tongues, regardless whether they are directly associated to the lap belts or whether the locking tongues include receptacles for engagement tongues provided on the lap belts. As the body belts are guided crosswise at the back of the occupant and interconnected, e.g. sewed, at the crossing points. This measure results in improved load conduction.

Extending from the length portions of the body belts, which length portions are secured in the area of the central buckle, e.g., to the locking tongues, are length-adjustable, loop-like leg belts which embrace the thigh of the occupant. The length-adjustability allows easy adaptation of the leg belts to respective body sizes. The ends of the body belts, distal to the central buckle, are then securely connected, e.g. sewed, starting from the crossing point with the leg belts on the backside of the thigh.

A belt assembly according to the present invention thus provides the preconditions for an occupant, when the belt assembly is attached beforehand to the occupant, to require only a coupling of the lap belts with the vehicle or, in the event the lap belts are associated to the vehicle, a coupling with the locking tongues, when occupying the position in the vehicle. Thanks to the retractors and the swinging capability of the lap belts in relation to the central buckle, the occupant can then randomly take the sitting or the standing position and is securely restrained in both positions.

The retractors are kept narrow enough to straddle in sitting position of an occupant the course of the groin area of the occupant and thus do not pose an obstacle. In addition, the belts are flat enough to allow optional wearing underneath a bullet-proof vest. Furthermore, the retractors are so covered so not to constitute an obstacle, when, e.g., in an armored vehicle the occupant has to leave the vehicle and has to move in lowest disposition (crawling) in the surrounding area of the vehicle. Also ambulances require a fast and easy separation.

As already afore-stated, the belt assembly is associated directly to the occupant, i.e. is worn on the body. Still, also the central buckle provides a further safety need when the occupant has to leave the vehicle as quickly as possible and has no time left to release the lap belts. It is then only necessary to open the central buckle to liberate oneself from the belt assembly.

According to another feature of the present invention, each of the body belts may have a connector in the area of the occupant's shoulder for detachable connection with the vehicle. In this way, the securement of the positions of the occupant in the vehicle is improved. These connectors may be provided either with engagement tongues or with tongue receptacles, whereby the respective counterpart is then located on the vehicle.

According to another feature of the present invention, the body belts may be operatively connected to retractors, at least indirectly. The retractors may be associated to the connectors or the safety straps located in the vehicle. Suitably, the retractors for the lap belts and the retractors for the body belts can be constructed to allow locking by hand. In this way, the occupant is able to establish a reliable positioning of the belt assembly before getting into a vehicle or also after occupying the sitting or standing positions.

In order to compensate the different belt course between the sitting and the standing positions, at least the retractors associated to the lap belts are swingable. In this way, lap belts can conform to the groin configuration. If need be, also the retractors associated to the body belts above the shoulders may be swingably integrated.

According to another feature of the present invention, the body belts may each include a handle loop in an area of the occupant's shoulder. Such handle loops are provided to be able to extract an immobile occupant from the vehicle, e.g. through narrow hatches of armored vehicles.

According to another feature of the present invention, the body belts may each be provided with a release mechanism in an area of the occupant's shoulder and coupled with the central buckle. Regardless whether the release device is actuated on one or the other shoulder, the central buckle can basically be operated to allow easy extraction of an occupant from the vehicle. The connection between the release devices and the central buckle may e.g. be realized via a cable pull which is embedded in a tube.

According to another feature of the present invention, at least the body belts and the central buckle form part of a vest to be worn by the occupant. Suitably, the locking tongues are connected beforehand with the central buckle. Preferably, the vest is made of webbing to prevent heat accumulation. The association of the belt assembly directly to a vest, for example by fastening the body belts and the central buckle to the vest, facilitates the attachment of the belt assembly before entering the vehicle. It is then only required, after embarking the vehicle, to couple the belt assembly with the vehicle. The vest can be designed in a desired manner so that it can be worn over uniforms and work clothes of diverse type. It can also be worn over or under bullet-proof vests.

In accordance with another feature of the present invention, the vest may include hook-and-loop fasteners in the shoulder area as well as in the side areas, i.e. underneath the arms. These hook-and-loop fasteners thus permit adjustment of the vest to all common sizes. The hook-and-loop fasteners in the shoulder area allow a length adjustment to match sizes while the hook-and-loop fasteners in the side areas permit width adjustment.

According to another feature of the present invention, the vest has a back region which may be provided with an elastic portion. Such an elastic portion is intended to facilitate the adjustment to the sitting position, on one hand, and to the standing position, on the other hand.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
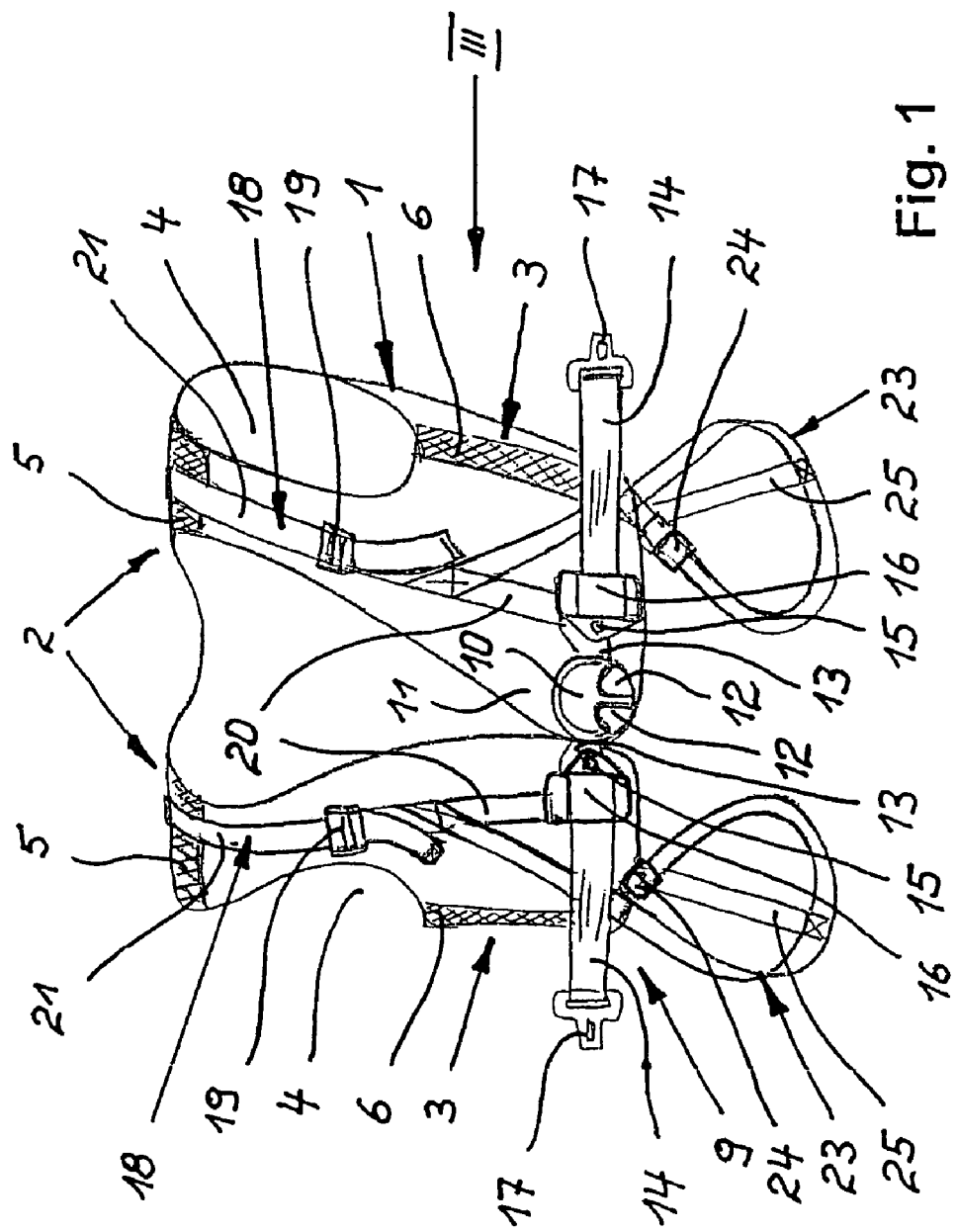
FIG. 1 shows a front perspective view of a belt assembly with vest in accordance with the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a front perspective view of a belt assembly, generally designated by reference numeral 9. In the non-limiting example of FIG. 1, the belt assembly is connected to a vest, generally designated by reference numeral 1 and worn by an occupant P of a vehicle F (indicated in FIGS. 5 to 7), when the occupant P has to perform operations in sitting as well as standing positions. Such an occupant P may involve, for example, the commander of an armored vehicle F. However, also an ambulance man or physician may wear such a vest 1 in a rescue vehicle F as also these persons have to perform activities in sitting and standing positions in the vehicle F during travel while being reliable restrained in the respective position. The vest 1 is suitably made of webbing to prevent heat accumulation.

In order to conform the vest 1 to various body sizes as well as body widths of an occupant P, hook-and-loop fasteners 5, 6 are provided in the shoulder areas 2 and in the side areas 3 underneath the armholes 4. As shown in particular in FIG. 2, the vest 1 has a lower back region 7 which is formed with an elastic portion 8 to facilitate the adaptation to a sitting and standing position of the occupant P. The vest 1 is so designed as to allow placement over uniforms and work clothes of various type. It can also be worn over or under bullet-proof vests.

Figure 6:
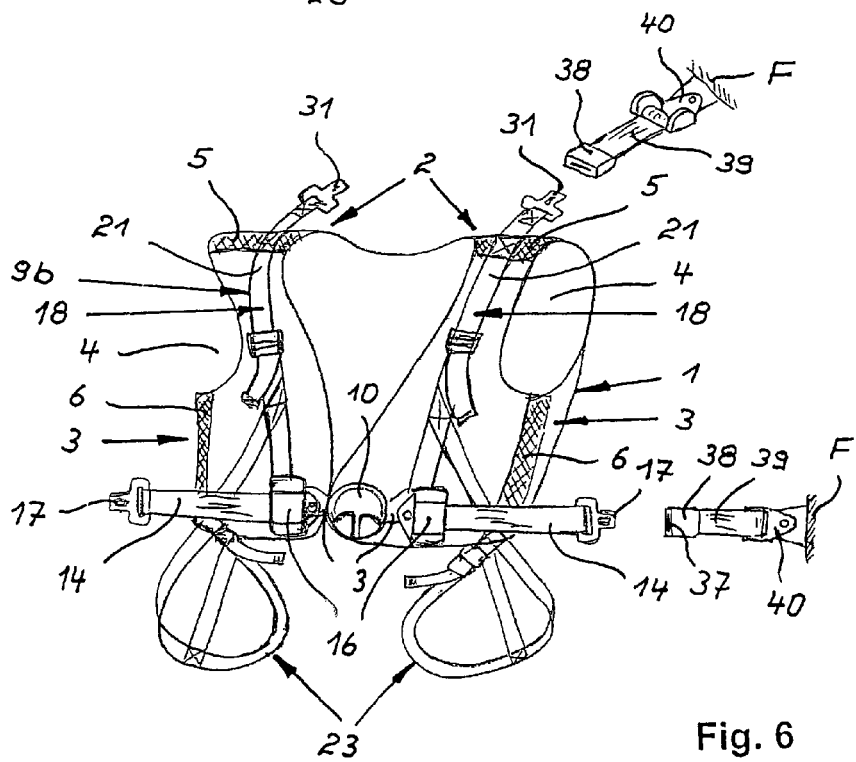
FIG. 6 is a perspective illustration of a third embodiment of a belt assembly with vest in accordance with the present invention.

The belt assembly 9 includes a central buckle 10 which is fastened to an abdomen-side part 11 of the vest 1. The central buckle 10 can be opened through turning by placing two fingers of the occupant P in two U-shaped troughs 12 from below. Although not shown in detail, the central buckle 10 has circumferential receiving openings for transverse engagement of locking tongues 13 provided at one end of lap belts 14 of the belt assembly 9. The locking tongues 13 have a joint 15 by which the lap belts 14 are swingable in parallel relationship to the body surface. The lap belts 14 are guided over retractors 16 (belt winders) and include engagement tongues 17 at their other end which is distal to the central buckle 10 for insertion in receiving openings 37 of connectors 38 which are provided on the vehicle, as shown in FIG. 6. The connectors 38 form hereby components of safety straps 39 with fastening elements 40.

Structure and operation of retractors 16 are generally known to the artisan and not described in more detail for the sake of simplicity.

Figure 2:
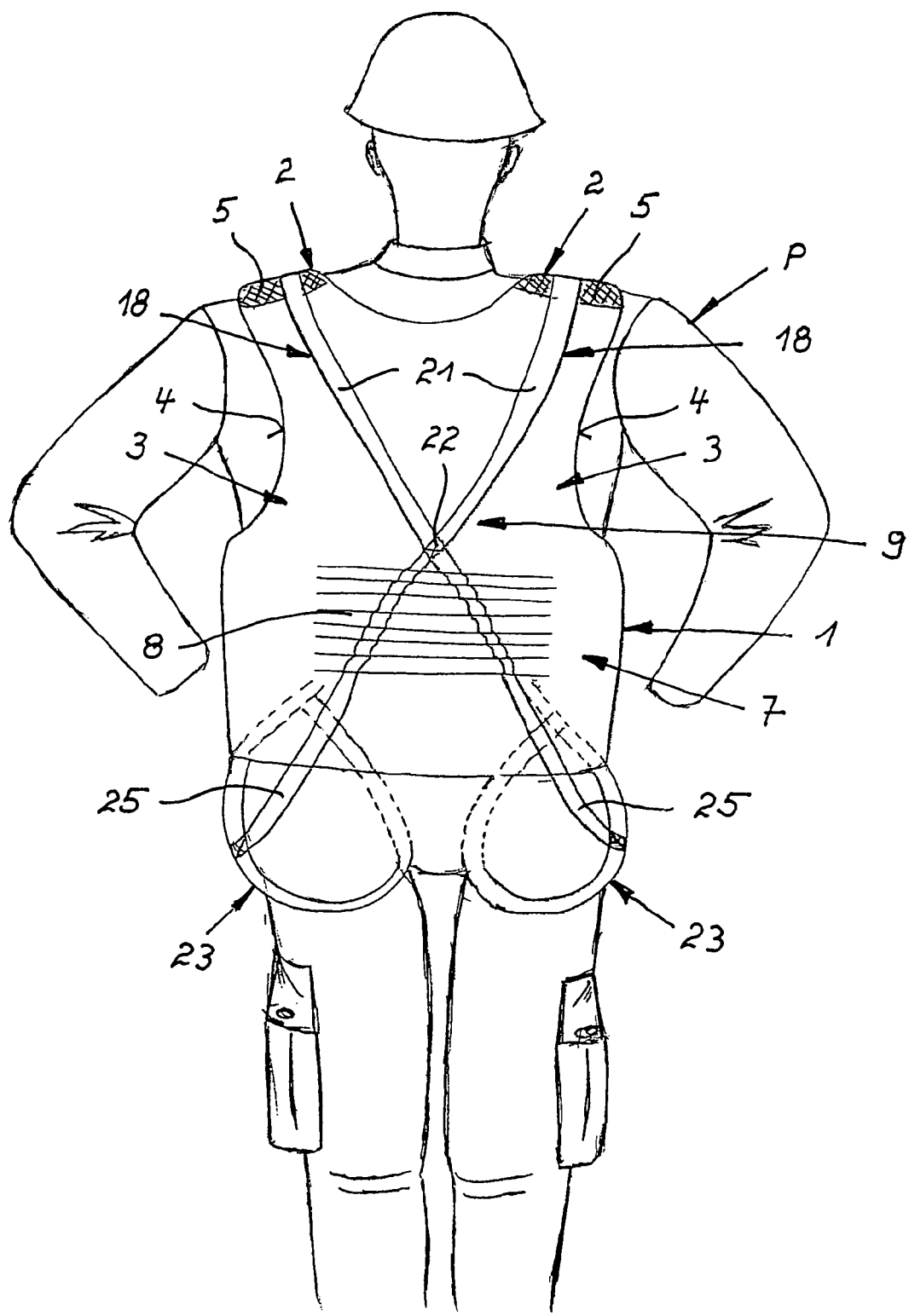
FIG. 2 is a rear view of an occupant of a vehicle with the belt assembly with vest according to FIG. 1.

Provided in the area of the locking tongues 13 are body belts 18 which extend across the torso, shoulders and back of the occupant P. The body belts 18 are provided in the torso region with length-adjustable slide fasteners 19 and have length portions 20 which are connected to the locking tongues 13 and connected, especially sewn, on the torso side to the vest 1. As shown in FIG. 2, at the occupant's back, the body belts 18 have length portions 21 which intersect and are connected, especially sewn, to one another at a crossing point 22 for load conduction. The body belts 18 are sewn in the elastic portion 8 below the crossing point 22 with the vest 1 so as to follow the stretch movements of the vest 1.

Extending slantingly downwards from the front length portions 20 of the body belts 18 are loop-like leg belts 23 which can be placed about the thigh of the occupant P. The leg belts 23 include also length-adjustable slide fasteners 24 so as to conform the leg belts 23 to the thighs of the occupant P. The body belts 18 have ends 25 which face away from the central buckle 10 and are connected, especially sewn, with the leg belts 23.

Figure 4:
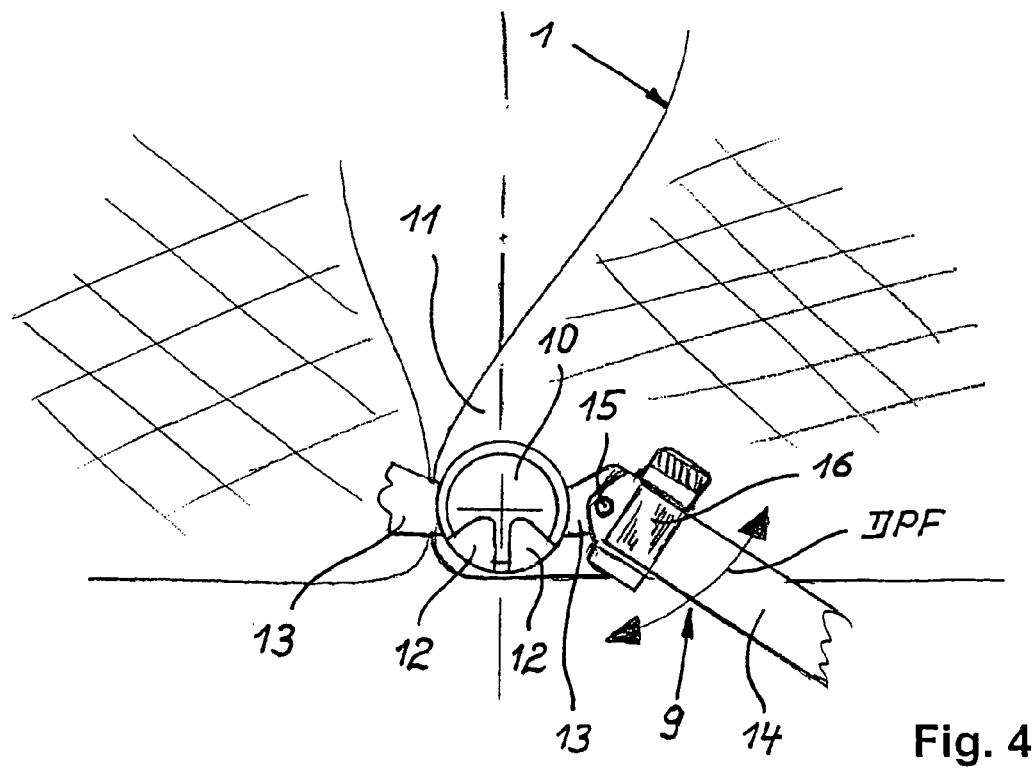
FIG. 4 is an enlarged view of a detail of FIG. 1 in the area of the central buckle of the belt assembly.

The lap belts 14 are swingable mounted via the joints 15 in a direction, indicated by double arrow DPF, as shown in FIG. 4. Thus, in conjunction with the retractors 16, the occupant P can be restrained in sitting position as well as standing position and is able to perform any required activity in a reliable manner.

The vest 1 is worn by the occupant P before embarking the vehicle F and can thus be precisely suited to the occupant P. For that purpose, the retractors 16 are manually lockable. The occupant P needs only to connect the lap belts 14 with the connectors 38 of the vehicle F after accessing the vehicle F. When leaving the vehicle F, the occupant P simply releases the lap belts 14 from the connectors 38 to free himself from the vehicle F. Should there be no time for the occupant P to release the lap belts 14, the occupant P may in this case actuate the central buckle 10 to rid himself or herself from the vest 1 entirely.

Figure 3:
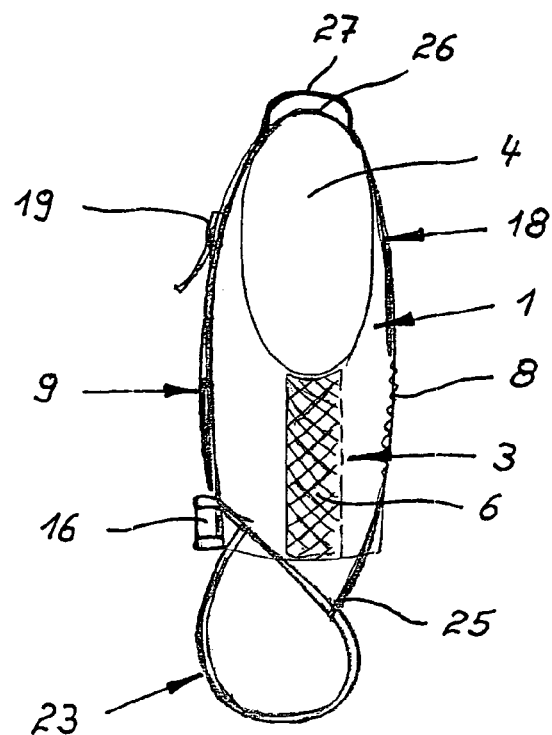
FIG. 3 shows a side view of the belt assembly with vest according to FIG. 1 as viewed in the direction of arrow III.

As shown in particular in FIG. 3, the belt assembly 9 is further provided with handle loops 27 in the shoulder-side portions 26 of the body belts 18. The handle loops 27 are intended to extract an occupant P from the vehicle F, for example through the hatch of an armored vehicle, when the occupant P is incapacitated.

Figure 5:
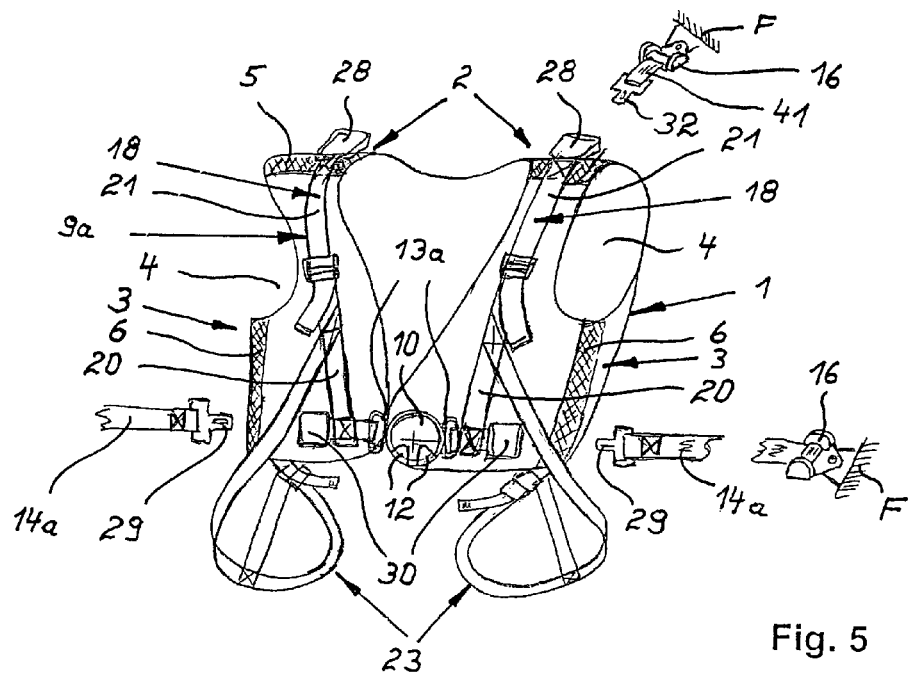
FIG. 5 is a perspective illustration of a second embodiment of a belt assembly with vest in accordance with the present invention.

Referring now to FIG. 5, there is shown a second embodiment of a belt assembly according to the present invention, generally designated by reference numeral 9a and also connected to vest 1. In the following description, parts corresponding with those in FIG. 1 will be identified by corresponding reference numerals followed by an "a", when modified. As shown in FIG. 5, the length portions 21 of the body belts 18 are provided with additional shoulder-side receptacles 28 in which engagement tongues 32 of safety straps 41, mounted to the vehicle F, can be inserted. In this case, the safety straps 41 are guided over retractors 16 to allow a switch between sitting and recumbent positions of the occupant P.

The belt assembly 9a has lap belts 14a which are fastened to the vehicle F and have engagement tongues 29 for insertion in receptacles 30 which are part of locking tongues 13a for engagement in the central buckle 10. The lap belts 14a are preferably also in this case guided over the retractors 16. The length portions 20 of the body belts 18 are connected between the locking tongues 13a and the receptacles 30.

FIG. 6 shows still another embodiment of a belt assembly according to the present invention, generally designated by reference numeral 9b and also connected to vest 1. Parts corresponding with those in FIG. 1 are denoted by identical reference numerals and not explained again. The description below will center on the differences between the embodiments. In this embodiment, the length portions 21 of the body belts 18 have engagement tongues 31 for engagement in receptacles 38 which are provided on safety straps 39 mounted to the vehicle F via fastening elements 40. Although not shown in the drawing, it is, of course, conceivable to integrate retractors in the safety straps. Lap belts 14, leg belts 23 and the area of the central buckle 10 are configured in this embodiment in correspondence to the embodiment of FIG. 1.

Figure 7:
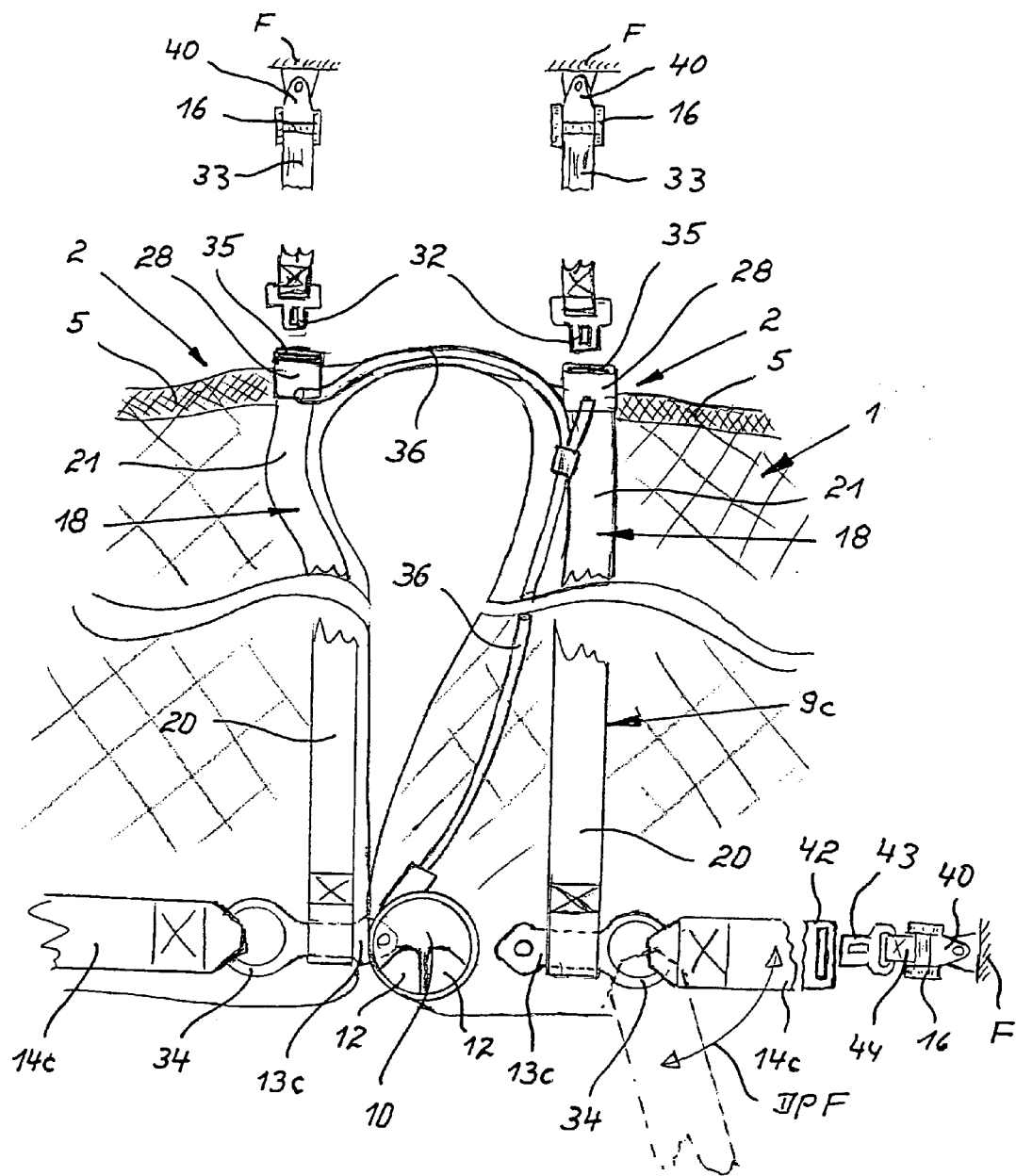
FIG. 7 is a front view, partly sectional, of a fourth embodiment of a belt assembly with vest in accordance with the present invention.

FIG. 7 shows still another embodiment of a belt assembly according to the present invention, generally designated by reference numeral 9c and also connected to vest 1. Parts corresponding with those in FIG. 1 are denoted by identical reference numerals and not explained again. The description below will center on the differences between the embodiments. In this embodiment, the length portions 21 of the body belts 18 are again provided with receptacles 28 for insertion of engagement tongues 32 which form part of safety straps 33 mounted to the vehicle F via fastening elements 40. The safety belts 33 can be guided over retractors 16. The length portions 20 of the body belts 18 are positioned next to locking tongues 13c and connected to the locking tongues 13c. These locking tongues 13c include ring-shaped connectors 34 for attachment of lap belts 14c which are swingable in parallel relationship to the body surface as indicated by double arrow DPF.

Located at an end of the lap belts 14c are receptacles 42 for engagement tongues 43 which in turn are connected to safety straps 44 guided over retractors 16. The safety straps 44 are connected to the vehicle F via fastening elements 40. The body belts 18 are further provided in the shoulder region 2 with release devices 35 which are coupled via cable-like connections 36 with the central buckle 10. When the release devices 35 are actuated, the central buckle 10 can be released from the shoulder region 2, for example in case of emergency, when the occupant P is incapacitated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A belt assembly for securing sitting and standing positions of an occupant of a vehicle, comprising:
   two lap belts having one end adapted for connection to the vehicle and another end, said lap belts being swingable in substantial parallel relation to the body of the occupant;
   a central buckle constructed to receive the other end of the lap belts;
   two length-adjustable body belts extending from an area of the central buckle across the torso, over the shoulder and across the back of the occupant and intersecting one another at a crossing point on the occupant's back for interconnection at the crossing point, said body belts having length portions which are respectively connected, at least indirectly, to the lap belts, and have ends distal to the central buckle; and
   two length-adjustable, loop-like leg belts connected to the ends of the length portions of the body belts.

2. The belt assembly of claim 1, wherein the lap belts are operatively connected to retractors.

3. The belt assembly of claim 1, wherein each of the body belts has a connector in the area of the occupant's shoulder for detachable connection with the vehicle.

4. The belt assembly of claim 1, wherein the body belts are operatively connected to retractors.

5. The belt assembly of claim 1, wherein the lap belts are operatively connected to retractors, the retractors for the lap belts and the retractors for the body belts being constructed to allow locking by hand.

6. The belt assembly of claim 2, wherein the retractors are swingably constructed.

7. The belt assembly of claim 1, wherein the body belts include each a handle loop in an area of the occupant's shoulder.

8. The belt assembly of claim 1, wherein the body belts are each provided with a release mechanism in an area of the occupant's shoulder and coupled with the central buckle.

9. The belt assembly of claim 8, wherein the release mechanism is connected to the central buckle via a cable pull which is embedded in a tube.

10. The belt assembly of claim 1, and further comprising a vest intended for wearing by the occupant, said body belts and said central buckle forming part of the vest.

11. The belt assembly of claim 10, wherein the vest has a shoulder area and a side area, each of the shoulder and side areas provided with hook-and-loop fasteners.

12. The belt assembly of claim 10, wherein the vest has a back region provided with an elastic portion.

13. The restraint harness of claim 1, wherein the lap belts have each a locking tongue intended for engagement in the central buckle and having a joint by which the lap belts are swingable in substantial parallel relationship to the body of the occupant.

14. A restraint harness for securing an occupant in a vehicle, comprising:
    a vest having a central buckle formed with two receiving openings; and
    a belt assembly including two lap belts having first ends for engagement in the receiving openings of the central buckle such as to allow a swinging of the lap belts in a parallel relation to the body of the occupant, and second ends for connection to a vehicle frame, two body belts encompassing the occupant's torso and crossing one another at the occupant's back at a crossing point for interconnection in the crossing point, said body belts having first end portions attached to a front of the vest and connected to the lap belts and second end portions and attached to a rear of the vest, and two loop-like leg belts respectively connected to second end portions of the body belts.

15. The restraint harness of claim 14, wherein the vest is made of webbing.

16. The restraint harness of claim 14, wherein the vest has a lower backside provided with an elastic portion.

17. The restraint harness of claim 16, wherein the second end portions are connected to the elastic portion.

18. The restraint harness of claim 17, wherein the central buckle has two substantially U-shaped troughs for placement of the occupant's fingers.

19. The restraint harness of claim 14, wherein the central buckle is constructed to release the lap belts when turned by two of the occupant's fingers.

20. The restraint harness of claim 14, wherein the body belts are constructed for connection to the vehicle frame.

* * * * *